United States Patent
Tsukuda et al.

(10) Patent No.: US 10,153,508 B2
(45) Date of Patent: Dec. 11, 2018

(54) METHOD FOR MANUFACTURING SOLID OXIDE FUEL CELL AND SOLID OXIDE FUEL CELL

(71) Applicant: Mitsubishi Hitachi Power Systems, Ltd., Yokohama-shi, Kanagawa (JP)

(72) Inventors: Hiroshi Tsukuda, Tokyo (JP); Yasuhiko Tsuru, Tokyo (JP); Kenichi Hiwatashi, Kanagawa (JP); Shin Yoshida, Kanagawa (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 337 days.

(21) Appl. No.: 14/886,367

(22) Filed: Oct. 19, 2015

(65) Prior Publication Data

US 2016/0218384 A1    Jul. 28, 2016

(30) Foreign Application Priority Data

Jan. 27, 2015   (JP) .................................. 2015-013757

(51) Int. Cl.

| | |
|---|---|
| *H01M 4/88* | (2006.01) |
| *H01M 8/1004* | (2016.01) |
| *H01M 8/1246* | (2016.01) |
| *H01M 4/02* | (2006.01) |
| *H01M 8/02* | (2016.01) |
| *H01M 8/124* | (2016.01) |

(52) U.S. Cl.
CPC ........... *H01M 8/1246* (2013.01); *H01M 4/02* (2013.01); *H01M 8/02* (2013.01); *H01M 2008/1293* (2013.01); *Y02E 60/525* (2013.01); *Y02P 70/56* (2015.11)

(58) Field of Classification Search
CPC .................. H01M 4/02; H01M 8/02
See application file for complete search history.

(56) References Cited

U.S. PATENT DOCUMENTS 6,534,211 B1 * 3/2003 Tsukuda .............. H01M 4/8621
429/489

FOREIGN PATENT DOCUMENTS

| JP | 3193294 B2 | 7/2001 |
|---|---|---|
| JP | 2004-186119 A | 7/2004 |
| JP | 2005-166510 A | 6/2005 |
| JP | 4456822 B2 | 4/2010 |
| JP | 2013-140737 A | 7/2013 |
| JP | 2015-118741 A | 6/2015 |

OTHER PUBLICATIONS

Office Action dated Dec. 12, 2017, issued in counterpart Japanese Application No. 2015-013757, with English machine translation. (5 pages).

* cited by examiner

*Primary Examiner* — Ladan Mohaddes

(74) *Attorney, Agent, or Firm* — Westerman, Hattori, Daniels & Adrian, LLP

(57) ABSTRACT

A method is provided for manufacturing a solid oxide fuel cell having excellent power generation performance and thermal cycle resistance and a solid oxide fuel cell. A method for manufacturing a solid oxide fuel cell includes a first step ST11 of sequentially forming a fuel electrode and a solid oxide electrolyte layer on a substrate; a second step ST12 of forming an air electrode intermediate layer on the solid oxide electrolyte layer; and a third step ST13 of forming, on the air electrode intermediate layer, an air electrode conductive layer using a mixture obtained by mixing first particles in a first average particle size range in which the average particle size (d50) is in a range of 27.0 μm to 31.0 μm and second particles in a second average particle size range having an average particle size (d50) smaller than the first average particle size range.

12 Claims, 5 Drawing Sheets

METHOD FOR MANUFACTURING SOLID OXIDE FUEL CELL AND SOLID OXIDE FUEL CELL

TECHNICAL FIELD

The present invention relates to a method for manufacturing a solid oxide fuel cell and a solid oxide fuel cell and, for example, relates to a method for manufacturing a solid oxide fuel cell having favorable power generation performance and thermal cycle resistance and a solid oxide fuel cell.

BACKGROUND ART

In the related art, a solid oxide fuel cell (SOFC) including an Air electrode layer having a bilayer structure in which a gas supply layer is stacked on a reaction layer has been proposed (for example, refer to Patent Document 1). In this solid oxide fuel cell, the reaction layer is formed using fine particles of a conductive ceramic having an average particle size of 2 μm or less and the gas supply layer is formed using 10 μm to 100 μm-coarse particles of a conductive ceramic connected to each other in a three-dimensional network form, thereby improving the power generation performance.

RELATED ART DOCUMENT

Patent Document

[Patent Document 1] Japanese Patent No. 4456822

SUMMARY OF THE INVENTION

Problem that the Invention is to Solve

Meanwhile, in the solid oxide fuel cell, in order to obtain high power generation performance, it is effective to increase the filling fraction of the air electrode conductive layer in the interface between the reaction layer (hereinafter, also referred to as "air electrode intermediate layer") and the gas supply layer (hereinafter, referred to as "air electrode conductive layer") so as to increase the three-phase boundary of an intermediate reaction layer/a gas supply layer/a gas phase and a reaction layer/a gas phase/an air electrode conductive layer.

However, in the solid oxide fuel cell of the related art, it is difficult to improve the power generation performance by increasing the filling fraction of the air electrode conductive layer in the interface between the air electrode intermediate layer and the air electrode conductive layer while maintaining the thermal cycle resistance.

The present invention has been made in consideration of the above-described circumstances and an object of the present invention is to provide a method for manufacturing a solid oxide fuel cell with which a solid oxide fuel cell having excellent power generation performance and thermal cycle resistance can be obtained and a solid oxide fuel cell.

Means for Solving the Problem

A method for manufacturing a solid oxide fuel cell of the present invention, includes: a first step of sequentially forming a fuel electrode and a solid electrolyte layer on a substrate; a second step of forming an air electrode intermediate layer on the solid oxide electrolyte layer; and a third step of forming, on the air electrode intermediate layer, an air electrode conductive layer having a composition represented by General Formula (1) described below using a mixture obtained by mixing first particles in a first average particle size range in which the average particle size (d50) is in a range of 25.0 μm to 35.0 μm and second particles in a second average particle size range having an average particle size (d50) smaller than the first average particle size range.

$$(La_{1-x-y}Sr_xCa_y)_zMnO_3 \quad \text{Formula (1)}$$

(in Formula (1), x, y, and z satisfy $0<x<0.5$, $0<y<0.5$, $0.1 \leq x+y \leq 0.5$, and $0.92 \leq z<1$.)

According to this method, since the mixture obtained by mixing coarse particles and fine particles having mutually different average particle size ranges is used, pores between the coarse particles are filled with the fine particles on the surface of the air electrode intermediate layer. Therefore, it is possible to increase the filling fraction of the air electrode conductive layer in the interface between the air electrode conductive layer and the air electrode intermediate layer having a specific composition while maintaining the thermal cycle resistance, and thus it is possible to improve the power generation performance. Therefore, it is possible to realize a method for manufacturing a solid oxide fuel cell with which a solid oxide fuel cell having excellent power generation performance and thermal cycle resistance can be obtained.

In the method for manufacturing a solid oxide fuel cell, the second average particle size range of the second particles is preferably in a range of 2.5 μm to 3.0 μm.

In the method for manufacturing a solid oxide fuel cell of the present invention, the first particles are preferably obtained using a spray dry method.

In the method for manufacturing a solid oxide fuel cell of the present invention, the mixing ratio between the first particles and the second particles is preferably in a range of 40:60 to 60:40.

A solid oxide fuel cell of the present invention is manufactured using the method for manufacturing a solid oxide fuel cell.

According to this configuration, since the mixture obtained by mixing coarse particles and fine particles having mutually different average particle size ranges is used, pores between the coarse particles are filled with the fine particles on the surface of the air electrode intermediate layer. Therefore, it is possible to increase the filling fraction of the air electrode conductive layer in the interface between the air electrode conductive layer and the air electrode intermediate layer having a specific composition while maintaining the thermal cycle resistance and thus it becomes possible to improve the power generation performance. Therefore, it is possible to realize a solid oxide fuel cell having excellent power generation performance and thermal cycle resistance.

Advantage of the Invention

According to the present invention, it is possible to realize a method for manufacturing a solid oxide fuel cell with which a solid oxide fuel cell having excellent power generation performance and thermal cycle resistance can be obtained and a solid oxide fuel cell.

BEST MODE FOR CARRYING OUT THE INVENTION

Hereinafter, embodiments of the present invention will be described in detail with reference to the accompanying drawings. Meanwhile, the present invention is not limited to the respective embodiments described below and can be carried out in an appropriately-modified manner. In addition, the respective embodiments described below can be carried out in an appropriate combination. In addition, constituent elements common to the respective embodiments will be given the same reference numbers and the description thereof will not be repeated.

Figure 1:
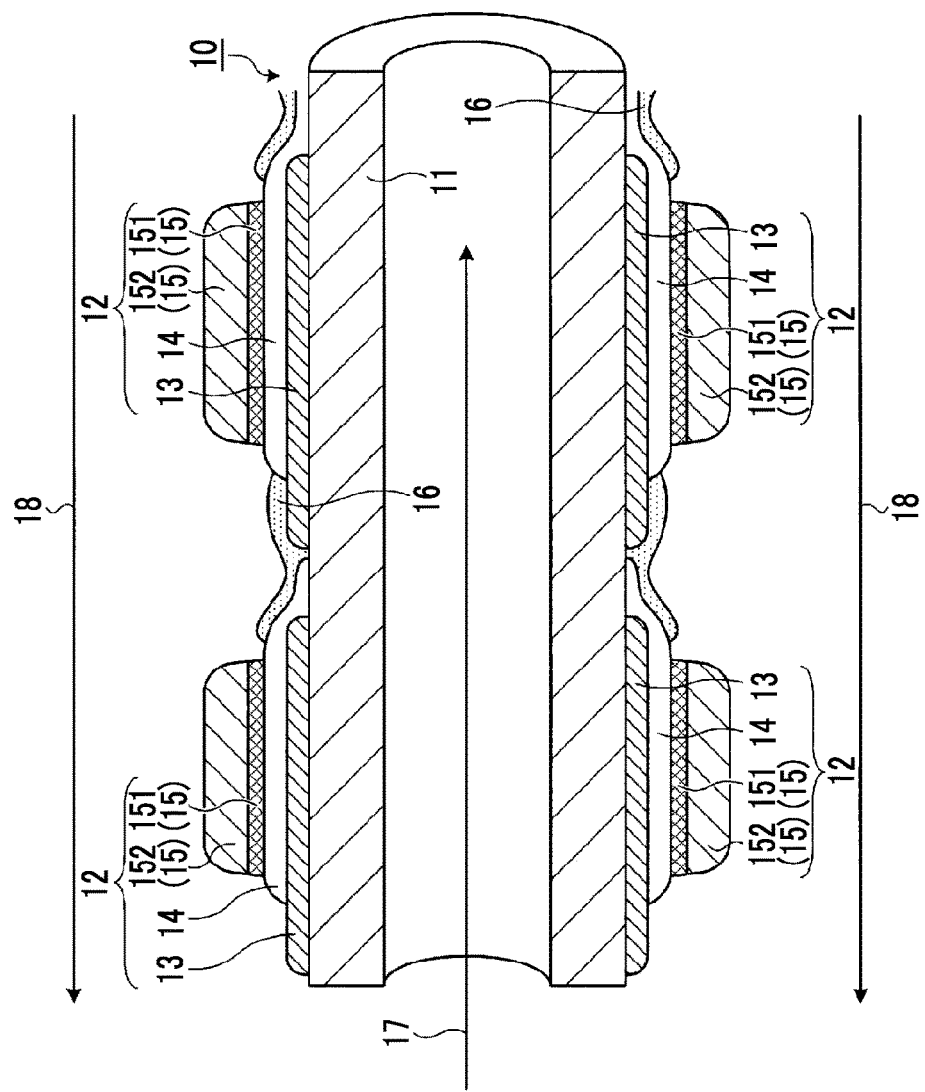
FIG. 1 is a schematic sectional view of a solid oxide fuel cell manufactured using a method for manufacturing a solid oxide fuel cell according to an embodiment of the present invention.

FIG. 1 is a schematic sectional view of a cell tube in a solid oxide fuel cell manufactured using a method for manufacturing a solid oxide fuel cell according to the present embodiment. Meanwhile, hereinafter, a solid oxide fuel cell including a tubular substrate will be described, but the present invention can be applied not only to a solid oxide fuel cell including a tubular substrate but also to a variety of solid oxide fuel cells in which substrate having a variety of shapes such as a planar substrate and a flat-tubular substrate are used. As illustrated in FIG. 1, a solid oxide fuel cell 10 according to the present embodiment includes a substrate 11 having a substantially tubular shape and a plurality of single cells 12 formed on the outer surface of the substrate 11. The single cell 12 includes a fuel electrode 13 provided on the substrate 11, a solid oxide electrolyte layer 14 provided on the fuel electrode 13, and an air electrode 15 provided on the solid oxide electrolyte layer 14. The air electrode 15 includes an air electrode intermediate layer 151 provided on the solid oxide electrolyte layer 14 and an air electrode conductive layer 152 provided on the air electrode intermediate layer 151. In the solid oxide fuel cell 10, a fuel (hydrogen gas or the like) 17 flows in one direction along the inside of the substrate 11 and air 18 flows in a direction opposite to the direction of the fuel 17 along the outside of the substrate 11, thereby generating power. Meanwhile, the substrate 11 may or may not be conductive and may be any of a fuel electrode support structure, an air electrode support structure, an electrolyte support structure, and an insulating support structure.

The single cell 12 is provided along the circumferential direction of the substrate 11. In addition, a plurality of the single cells 12 is provided in parallel along the tube axial direction of the substrate 11. The solid oxide electrolyte layer 14 is provided so that a part thereof comes into contact with the substrate 11 at one end portion of the single cell 12 in the tube axial direction of the substrate 11. In addition, the solid oxide electrolyte layer 14 is provided so as not to come into contact with the fuel electrode 13 in the adjacent single cell 12. An interconnector 16 that couples the single cells 12 adjacent to each other is formed between a plurality of the single cells 12. The interconnector 16 is in contact with the substrate 11 between the solid oxide electrolyte layer 14 in the single cell 12 and the fuel electrode 13 in the adjacent single cell 12. The air electrode intermediate layer 151 of the air electrode 15 is provided so as to be in contact with the solid oxide electrolyte layer 14 and the interconnector 16. In addition, the air electrode conductive layer 152 of the air electrode 15 is provided so as to be in contact with the air electrode intermediate layer 151.

The substrate 11 is configured by including a porous material, mainly, calcia stabilized zirconia (CSZ). When the substrate 11 is configured using the porous material, the substrate 11 becomes porous and thus hydrogen gas or the like, which is used as the fuel 17, flows from the inside to outside (toward the fuel electrode 13) of the substrate 11.

The fuel electrode 13 is configured using a compound material of nickel oxide (NiO) and a zirconia-based electrolyte material. As the compound material, it is possible to use, for example, a mixture of NiO and yttria stabilized zirconia ($Y_2O_3$ stabilized $ZrO_2$: YSZ) or the like. The thickness of the fuel electrode 13 is, for example, 120 μm.

The solid oxide electrolyte layer 14 has electron-insulating properties, airtightness so that gas such as the fuel 17 or the air 18 does not pass through, and high ion permeability at a high temperature. The solid oxide electrolyte layer 14 is configured using, for example, YSZ or the like. The thickness of the solid oxide electrolyte layer 14 is, for example, 80 μm.

Figure 2:
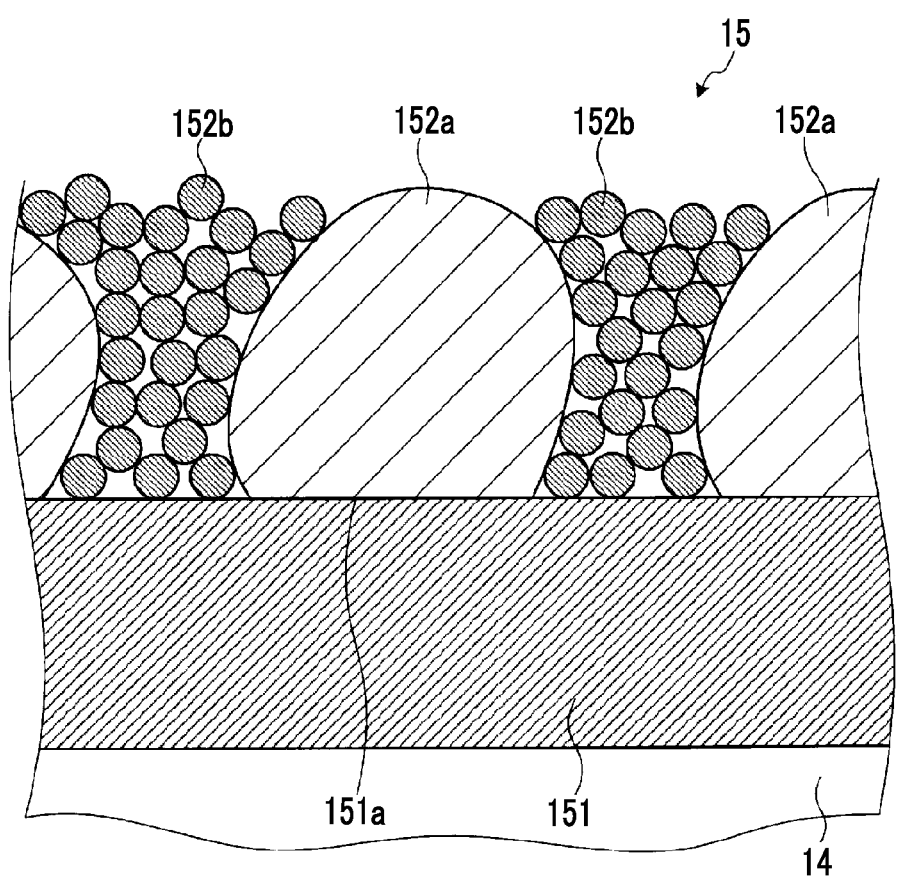
FIG. 2 is an enlarged view of an interface between a solid oxide electrolyte layer and an air electrode.

FIG. 2 is an enlarged view of the interface between the solid oxide electrolyte layer 14 and the air electrode 15. As illustrated in FIG. 2, in the present embodiment, in the air electrode 15, an air electrode conductive layer 152 including coarse particles (first particles) 152a having a first average particle size range and fine particles (second particles) 152b having a second particle size range that is relatively smaller than the first average particle size range is provided on the air electrode intermediate layer 151. Therefore, in the air electrode conductive layer 152, pores between the coarse particles 152a are filled with the fine particles 152b on the air electrode intermediate layer 15 and thus it becomes possible to improve the filling fraction of the air electrode conductive layer 152 in an interface 151a between the air electrode conductive layer 152 and the air electrode intermediate layer 151. As a result, the solid oxide fuel cell 10 becomes capable of improving the power generation performance while maintaining the thermal cycle resistance. Meanwhile, in the present invention, the average particle size is the measurement value of the average particle size (d50) of the coarse particles 152a and the fine particles 152b measured using a laser diffraction particle size distribution analyzer (manufactured by Nikkiso Co., Ltd.).

The air electrode intermediate layer 151 includes a ceria compound represented by $Sm_{1-x}Ce_xO_2$ (0.8≤x≤0.9). The film thickness of the air electrode intermediate layer 151 is, for example, in a range of 10 μm to 20 μm.

The air electrode conductive layer 152 includes a perovskite oxide containing La, Sr, Ca, and MnO. As the coarse particles 152a in the air electrode conductive layer 152, it is possible to use spherical particles obtained by drying a slurry of the perovskite oxide using a spray dry method. In addition, as the fine particles 152b in the air electrode conductive layer 152, it is possible to use particles obtained by treating the coarse particles 152a at a low temperature (for example, 900° C.) at which the perovskite structure can be maintained and then crushing the fine particles.

The air electrode conductive layer 152 includes a perovskite oxide represented by General Formula (1) described below from the viewpoint of improving the power generation performance and the thermal cycle resistance of the solid oxide fuel cell 10.

$$(La_{1-x-y}Sr_xCa_y)_zMnO_3 \quad \text{Formula (1)}$$

(in Formula (1), x, y, and z satisfy $0<x<0.5$, $0<y<0.5$, $0.1 \leq x+y \leq 0.5$, and $0.92 \leq z<1$).

In the perovskite oxide represented by General Formula (1), Mn located at the B site is excessively present with respect to La, Sr, and Ca located at the A site. The A/B ratio (the ratio of the total molar number of La, Sr, and Ca to the molar number of Mn) before sintering is preferably set in a range of 0.92 to less than 1.0 from the viewpoint of improving the power generation performance and the thermal cycle resistance of the solid oxide fuel cell. The film thickness of the air electrode conductive layer 152 is, for example, in a range of 500 μm to 1500 μm.

In addition, the first average particle size range of the coarse particles 152a in the air electrode conductive layer 152 is in a range of 25.0 μm to 35.0 μm. Therefore, the solid oxide fuel cell 10 is improved in terms of power generation performance and thermal cycle resistance. The first average particle size range is more preferably in a range of 27.0 μm to 31.0 μm.

In addition, the second average particle size range of the fine particles 152b in the air electrode conductive layer 152 is preferably in a range of 2.5 μm to 3.0 μm. Therefore, the solid oxide fuel cell 10 is further improved in terms of power generation performance and thermal cycle resistance.

The interconnector 16 is configured using a conductive perovskite oxide expressed by $M_{1-z}L_zTiO_3$ (M represents an alkaline-earth metal element, L represents a lanthanoid element, and $0.05 \leq z \leq 0.2$) such as strontium titanate. As the interconnector 16, it is possible to use, for example, a conductive perovskite oxide of $Sr_{1-z}La_zTiO_3$ ($0.05 \leq z \leq 0.2$). The interconnector 16 forms a dense film so as to prevent hydrogen gas in the fuel 17 and the air 18 from being mixed together.

Meanwhile, the substrate 11, the fuel electrode 13, the solid oxide electrolyte layer 14, and the interconnector 16 are not limited to the above-described materials and a variety of materials can be used as long as the effects of the present invention are exhibited.

Figure 3:
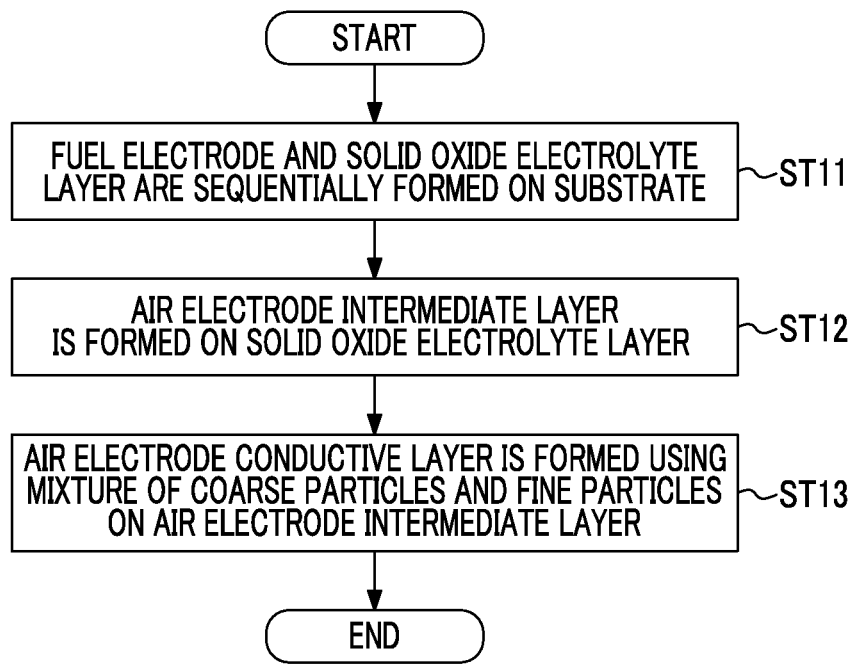
FIG. 3 is a flowchart illustrating the outline of the method for manufacturing a solid oxide fuel cell 10 according to the present embodiment.

Next, a method for manufacturing the solid oxide fuel cell 10 according to the present embodiment will be described in detail. FIG. 3 is a flowchart illustrating the outline of the method for manufacturing the solid oxide fuel cell 10 according to the present embodiment. As illustrated in FIG. 3, the method for manufacturing the solid oxide fuel cell 10 according to the present embodiment includes a first step ST11 of sequentially forming the fuel electrode 13 and the solid oxide electrolyte layer 14 on the substrate 11, a second step ST12 of forming the air electrode intermediate layer 151 on the solid oxide electrolyte layer 14, and a third step of forming, on the air electrode intermediate layer 151, the air electrode conductive layer 152 using a mixture obtained by mixing the coarse particles 152a in the first average particle size range in which the average particle size (d50) is in a range of 25.0 μm to 35.0 μm and the fine particles 152b in the second average particle size range having an average particle size (d50) which is smaller than the first average particle size range.

First, in the first step ST11, the substrate 11 is formed by shaping calcium stabilized zirconia (CSZ) or the like using an extrusion method. Next, a powder mixture of Ni+YSZ and an aqueous vehicle obtained by adding a dispersant such as methyl cellulose, a binder such as polyethylene oxide, and a defoamer such as glycerin to water are mixed together, thereby preparing a slurry for the fuel electrode. The mixing ratio between Ni and YSZ is appropriately selected depending on the required performance of the fuel electrode 13. The mixing ratio between the powder mixture and the aqueous vehicle is appropriately selected depending on the thickness of the fuel electrode 13, the state of a fuel electrode film to which the slurry is applied, and the like.

Next, the YSZ powder and the aqueous vehicle are mixed together, thereby preparing a slurry for a solid oxide electrolyte layer. The mixing ratio between the YSZ powder and the aqueous vehicle is appropriately selected depending on the thickness of the solid oxide electrolyte layer 14, the state of a solid oxide electrolyte layer to which the slurry is applied, and the like.

Next, the slurry for the fuel electrode and the slurry for the solid oxide electrolyte layer, which are prepared along the circumferential direction, are applied onto the outer surface of the substrate 11 through screen printing, thereby forming the fuel electrode 13 and the solid oxide electrolyte layer 14. Here, as illustrated in FIG. 1, the stacked film of the fuel electrode 13 and the solid oxide electrolyte layer 14 is formed in a plurality of divided segments and thus a plurality of single cells 12 is formed.

Next, $M_{1-z}L_zTiO_3$ (M represents an alkaline-earth metal element, L represents a lanthanoid element, and $0.05 \leq z \leq 0.2$) powder and the aqueous vehicle are mixed together, thereby preparing a slurry for the interconnector. The composition of the powder is appropriately selected depending on the required performance of the interconnector 16. The mixing ratio between the powder and the aqueous vehicle is appropriately selected depending on the state of the interconnector 16 to which the slurry is applied, and the like.

Next, in the substrate 11 in which the fuel electrode 13 and the solid oxide electrolyte layer 14 are formed, the slurry for the interconnector prepared along the circumferential direction is applied onto the outer surface of the substrate 11 between the adjacent stacked layers of the fuel electrode 13 and the solid oxide electrolyte layer 14 through screen printing, thereby forming the interconnector 16.

Next, the substrate 11 in which the fuel electrode 13, the solid oxide electrolyte layer 14, and the interconnector 16 are formed is co-sintered in the atmosphere. The sintering temperature is, for example, in a range of 1350° C. to 1450° C.

Next, in the second step ST12, $Sm_{1-x}Ce_xO_2$ ($0.8 \leq x \leq 0.9$) powder and the aqueous vehicle are mixed together, thereby preparing a slurry for the air electrode intermediate layer. The mixing ratio between the powder and the aqueous vehicle is appropriately selected depending on the state of the air electrode intermediate layer to which the slurry is applied, and the like.

Next, the prepared slurry for the air electrode intermediate layer is applied to the solid oxide electrolyte layer 14 in the co-sintered substrate 11 along the circumferential direction of the substrate 11, thereby forming the air electrode intermediate layer 151. The air electrode intermediate layer 151 is formed using, for example, a printing method.

In the third step ST13, the coarse particles 152a having an average particle size satisfying the first average particle size range, which are produced from a perovskite oxide satisfying General Formula (1) described below using a spray dry method, and the fine particles 152b obtained by crushing the coarse particles 152a synthesized at a low temperature (for example, 900° C.) at which the perovskite structure can be maintained so that the average particle size falls into the second average particle size range are prepared. Meanwhile, the fine particles 152a may be prepared using a different perovskite oxide from that for the coarse particles 152a. In addition, a mixture obtained by mixing the powders of the prepared coarse particles 152a and the prepared fine particles 152b at a predetermined fraction (for example, 50:50) and the aqueous vehicle are mixed together, thereby preparing a slurry for the air electrode conductive layer. The mixing ratio between the powder and the aqueous vehicle is appropriately selected depending on the state of the air electrode conductive layer to which the slurry is applied, and the like.

  Formula (1)

(in Formula (1), x, y, and z satisfy $0<x<0.5$, $0<y<0.5$, $0.1 \leq x+y \leq 0.5$, and $0.92 \leq z<1$. The A/B ratio is in a range of 0.92 to 1.00.)

In the third step ST13, the mixing ratio between the coarse particles 152a and the fine particles 152b is preferably in a range of 40:60 to 60:40 and more preferably 50:50 from the viewpoint of improving the power generation performance and the thermal cycle resistance of the solid oxide fuel cell.

Next, the prepared slurry for the air electrode conductive layer is applied onto the air electrode intermediate layer 151 along the circumferential direction of the substrate 11 through screen printing, thereby forming the air electrode conductive layer 152. Next, the substrate 11 in which the air electrode intermediate layer 151 and the air electrode conductive layer 152 are formed is sintered in the atmosphere. The sintering temperature is, for example, in a range of 1100° C. to 1250° C. The sintering temperature at this time is set to a lower temperature than the co-sintering temperature after the substrate 11, the fuel electrode 13, the solid oxide electrolyte layer 14, and the interconnector 16 are formed. Through the above-described steps, the solid oxide fuel cell 10 including the single cells 12 formed on the substrate 11 is obtained.

As described above, according to the above-described embodiment, since the air electrode conductive layer 152 is formed using the mixture obtained by mixing the coarse particles 152a and the fine particles 152b having mutually different average particle size ranges, pores between the coarse particles 152a are filled with the fine particles 152b on the surface of the air electrode intermediate layer 151. Therefore, since the filling fraction of the air electrode conductive layer 152 in the interface 151a between the air electrode conductive layer 152 and the air electrode intermediate layer 151 is increased while the thermal cycle resistance is maintained and thus the number of three-layer interfaces of the air electrode intermediate layer 151/the air electrode conductive layer 152/a gas phase increases, it becomes possible to improve the power generation performance. Therefore, it is possible to realize a method for manufacturing a solid oxide fuel cell with which the solid oxide fuel cell 10 having excellent power generation performance and thermal cycle resistance can be obtained.

EXAMPLES

Hereinafter, the present invention will be described in detail on the basis of examples in order to clarify the effects of the present invention. Meanwhile, the present invention is not limited to the following examples and comparative examples.

Example 1

Methyl cellulose as a dispersing material, polyethylene oxide as a binder, and glycerin as a defoamer were added to calcium stabilized zirconia (CSZ) as a main raw material, and were kneaded using a pressurized kneader while adding water until the mixture obtained a green body form. This kneaded substance was shaped into a tubular shape using an Auger-type extruder, thereby producing a substrate.

Next, NiO+YSZ, which was a raw material, was made into a slurry using three rollers, thereby preparing a slurry for producing a fuel electrode. In addition, YSZ was made into a slurry using three rollers, thereby preparing a slurry for producing an electrolyte. Furthermore, $Sr_{0.9}La_{0.1}TiO_3$ was made into a slurry using three rollers, thereby preparing a slurry for producing an interconnector.

A fuel electrode (thickness: 100 μm), an electrolyte (thickness: 80 μm), and an interconnector (thickness: 30 μm) were sequentially formed on the tubular substrate, were dried, and then were held at 1400° C. for three hours or longer, thereby being co-sintered. Next, $Sm_{0.2}Ce_{0.8}O_2$ that had been made into a slurry using three rollers was applied onto an electrolyte layer and the interconnector on the co-sintered substrate using a screen printing method, thereby forming an air electrode intermediate layer having a film thickness of 10 μm. Next, a slurry of $(La_{0.5}Sr_{0.25}Ca_{0.25})_{0.92}MnO_3$ that had been made into a slurry using three rollers was dried at approximately 80° C. or higher using a spray dry method and was fired at 1300° C. for four hours, thereby obtaining coarse particles for forming an air electrode conductive layer having an average particle size of 30.5 μm and a porosity of 7.3% or less. Next, a raw material for the air electrode conductive layer was fired at 900° C. and then was crushed, thereby obtaining fine particles for forming an air electrode having an average particle size of 2.8 μm.

Figure 4:
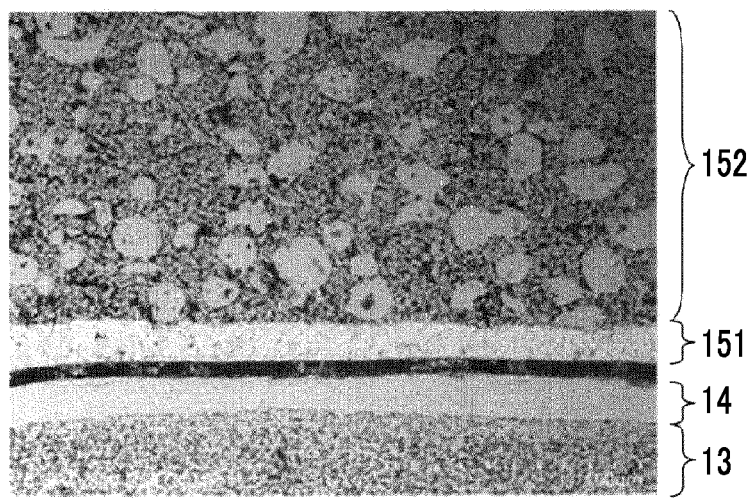
FIG. 4 is a sectional photograph of an air electrode in a solid oxide fuel cell according to an example of the present invention.
Figure 5:
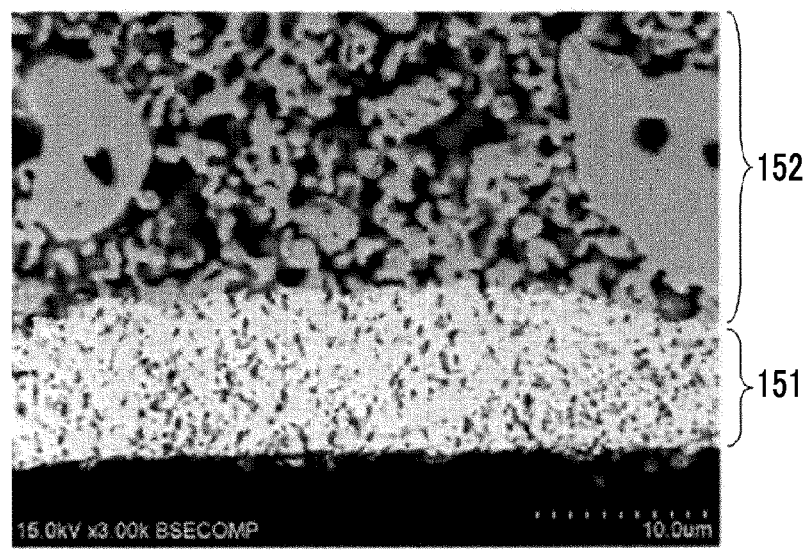
FIG. 5 is a sectional photograph of the air electrode in the solid oxide fuel cell according to the example of the present invention.

Next, a slurry obtained by mixing the obtained fine particles and coarse particles at a 50:50 fraction and making the mixture into a slurry using three rollers was applied onto the air electrode intermediate layer using a screen printing method so as to form a layer, thereby forming the air electrode conductive layer having a thickness of approximately 800 μm. After that, the air electrode conductive layer was sintered at 1200° C. for two hours, thereby obtaining a solid oxide fuel cell. The average filling fraction in a range of 30 μm from the interface between the air electrode intermediate layer and the air electrode conductive layer toward the air electrode conductive layer was 64.7% in terms of the average of the entire air electrode conductive layer. The number of three-phase boundary of the air electrode intermediate layer/the air electrode conductive layer/a gas phase was 96 interfaces/100 μm. Meanwhile, the number of the three-layer interfaces was computed from the average value of the numbers of portions in 100 μm with which the air electrode intermediate layer/the air electrode conductive layer/the gas phase came into contact counted in three photographs of the sections of the air electrode of the air electrode. In addition, the average fine pore size in the air electrode intermediate layer was 0.4 μm on average. The photographs of the sections of the air electrode in the obtained solid oxide fuel cell are illustrated in FIGS. 4 and 5. As is clear from FIGS. 4 and 5, in the solid oxide fuel cell of Example 1, pores between the coarse particles configuring the air electrode conductive layer in the interface between the air electrode intermediate layer and the air electrode conductive layer were filled with the fine particles and the filling fraction of the air electrode conductive layer was high.

Next, while 70% $H_2$—$N_2$ was made to flow as a fuel along the inside of the substrate in the obtained solid oxide fuel cell and the air was made to flow along the outside of the substrate, the solid oxide fuel cell was held at 900° C., thereby carrying out a power generation test. The fuel utilization factor was 75% and the air utilization factor was 20%. The power generation performance was 450 mA/cm$^2$-0.76 V and the thermal cycle resistance, which determines the power decline of 5% or more after the heat cycle, was 20 times or more. The composition of the air electrode conductive layer in the obtained solid oxide fuel cell and the results of the power generation test are described in Table 1 below. Meanwhile, the average particle sizes in Table 1 are values obtained by measuring the coarse particles 152a and the fine particles 152b using a laser diffraction particle size distribution analyzer (manufactured by Nikkiso Co., Ltd.).

Example 2

A solid oxide fuel cell was produced and a power generation test was carried out in the same manner as in Example 1 except for the fact that $(La_{0.5}Sr_{0.25}Ca_{0.25})_{0.99}MnO_3$ was used for the formation of the air electrode conductive layer, the average particle size of the coarse particles was set to 30.1 µm, and the average particle size of the fine particles was set to 2.9 µm. The power generation performance was 450 mA/cm$^2$-0.77 V and the thermal cycle resistance was 20 times or more. The composition of the air electrode conductive layer in the obtained solid oxide fuel cell and the results of the power generation test are described in Table 1 below.

Example 3

A solid oxide fuel cell was produced and a power generation test was carried out in the same manner as in Example 1 except for the fact that $(La_{0.5}Sr_{0.25}Ca_{0.25})_{0.97}MnO_3$ was used for the formation of the air electrode conductive layer, the average particle size of the coarse particles was set to 28.5 µm, and the average particle size of the fine particles was set to 2.7 µm. The power generation performance was 450 mA/cm$^2$-0.78 V and the thermal cycle resistance was 20 times or more. The composition of the air electrode conductive layer in the obtained solid oxide fuel cell and the results of the power generation test are described in Table 1 below.

Example 4

A solid oxide fuel cell was produced and a power generation test was carried out in the same manner as in Example 1 except for the fact that $(La_{0.7}Sr_{0.15}Ca_{0.15})_{0.97}MnO_3$ was used for the formation of the air electrode conductive layer, the average particle size of the coarse particles was set to 29.4 µm, and the average particle size of the fine particles was set to 2.9 µm. The power generation performance was 450 mA/cm$^2$-0.77 V and the thermal cycle resistance was 20 times or more. The composition of the air electrode conductive layer in the obtained solid oxide fuel cell and the results of the power generation test are described in Table 1 below.

Example 5

A solid oxide fuel cell was produced and a power generation test was carried out in the same manner as in Example 1 except for the fact that $(La_{0.9}Sr_{0.05}Ca_{0.0}O_{0.97})MnO_3$ was used for the formation of the air electrode conductive layer, the average particle size of the coarse particles was set to 29.6 µm, and the average particle size of the fine particles was set to 2.8 µm. The power generation performance was 450 mA/cm$^2$-0.78 V and the thermal cycle resistance was 20 times or more. The composition of the air electrode conductive layer in the obtained solid oxide fuel cell and the results of the power generation test are described in Table 1 below.

Example 6

A solid oxide fuel cell was produced and a power generation test was carried out in the same manner as in Example 1 except for the fact that $(La_{0.7}Sr_{0.2}Ca_{0.1})_{0.97}MnO_3$ was used for the formation of the air electrode conductive layer, the average particle size of the coarse particles was set to 29.9 µm, and the average particle size of the fine particles was set to 2.8 µm. The power generation performance was 450 mA/cm$^2$-0.76 V and the thermal cycle resistance was 20 times or more. The composition of the air electrode conductive layer in the obtained solid oxide fuel cell and the results of the power generation test are described in Table 1 below.

Example 7

A solid oxide fuel cell was produced and a power generation test was carried out in the same manner as in Example 1 except for the fact that $(La_{0.6}Sr_{0.1}Ca_{0.3})_{0.97}MnO_3$ was used for the formation of the air electrode conductive layer, the average particle size of the coarse particles was set to 30.1 µm, and the average particle size of the fine particles was set to 2.6 µm. The power generation performance was 450 mA/cm$^2$-0.78 V and the thermal cycle resistance was 20 times or more. The composition of the air electrode conductive layer in the obtained solid oxide fuel cell and the results of the power generation test are described in Table 1 below.

Example 8

A solid oxide fuel cell was produced and a power generation test was carried out in the same manner as in Example 1 except for the fact that $(La_{0.5}Sr_{0.4}Ca_{0.1})_{0.97}MnO_3$ was used for the formation of the air electrode conductive layer, the average particle size of the coarse particles was set to 27.9 µm, and the average particle size of the fine particles was set to 2.8 µm. The power generation performance was 450 mA/cm$^2$-0.78 V and the thermal cycle resistance was 20 times or more. The composition of the air electrode conductive layer in the obtained solid oxide fuel cell and the results of the power generation test are described in Table 1 below.

Example 9

A solid oxide fuel cell was produced and a power generation test was carried out in the same manner as in Example 1 except for the fact that $(La_{0.5}Sr_{0.1}Ca_{0.4})_{0.97}MnO_3$ was used for the formation of the air electrode conductive layer, the average particle size of the coarse particles was set to 29.2 µm, and the average particle size of the fine particles was set to 2.9 µm. The power generation performance was 450 mA/cm$^2$-0.75 V and the thermal cycle resistance was 20 times or more. The composition of the air electrode conductive layer in the obtained solid oxide fuel cell and the results of the power generation test are described in Table 1 below.

Comparative Example 1

Figure 6:
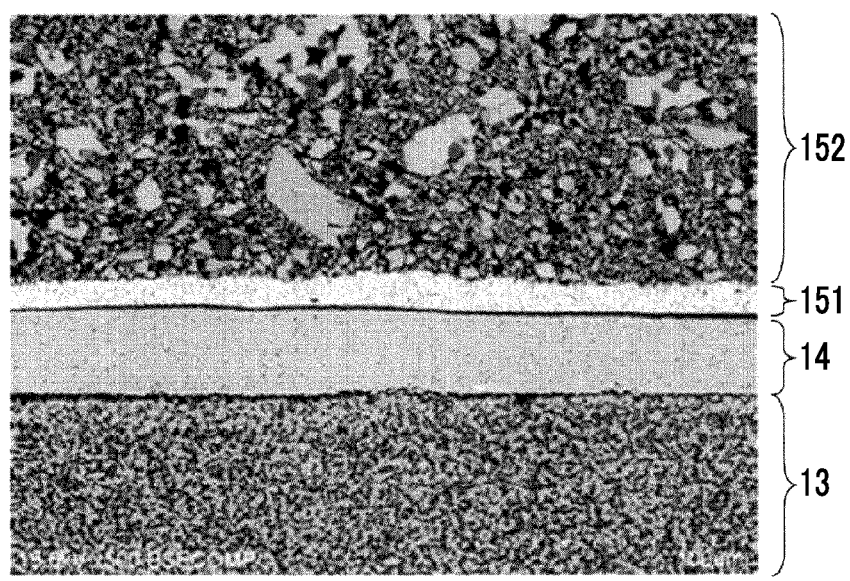
FIG. 6 is a sectional photograph of the air electrode in a solid oxide fuel cell according to a comparative example of the present invention.
Figure 7:
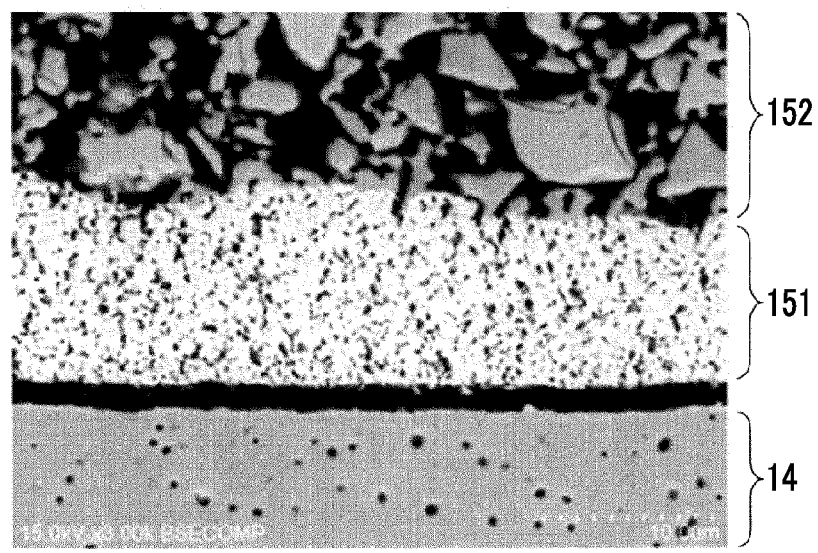
FIG. 7 is a sectional photograph of the air electrode in the solid oxide fuel cell according to the comparative example of the present invention.

A solid oxide fuel cell was produced and a power generation test was carried out in the same manner as in Example 1 except for the fact that $(La_{0.5}Sr_{0.25}Ca_{0.25})_{0.95}MnO_3$ was used for the formation of the air electrode conductive layer, the average particle size of the coarse particles was set to 17 μm, and the average particle size of the fine particles was set to 2.7 μm. The filling fraction of the air electrode conductive layer was 61.5% in terms of the average of the entire air electrode conductive layer. The number of three-phase boundary of the air electrode intermediate layer/the air electrode conductive layer/the gas phase was 82 interfaces/100 μm. The power generation performance was 450 mA/cm²-0.74 V and the thermal cycle resistance was 15 times. The photographs of the sections of the air electrode in the obtained solid oxide fuel cell are illustrated in FIGS. 6 and 7. As is clear from FIGS. 6 and 7, in the solid oxide fuel cell of Comparative Example 1, pores between the coarse particles were not sufficiently filled with the fine particles configuring the air electrode conductive layer in the interface between the air electrode intermediate layer and the air electrode conductive layer compared with Example 1 and the filling fraction of the air electrode conductive layer was low. The composition of the air electrode conductive layer in the obtained solid oxide fuel cell and the results of the power generation test are described in Table 1 below.

Comparative Example 2

A solid oxide fuel cell was produced and a power generation test was carried out in the same manner as in Example 1 except for the fact that $(La_{0.5}Sr_{0.25}Ca_{0.25})_{0.91}MnO_3$ was used for the formation of the air electrode conductive layer, the average particle size of the coarse particles was set to 26.4 μm, and the average particle size of the fine particles was set to 2.6 μm. The power generation performance was 450 mA/cm²-0.71 V and the thermal cycle resistance was 20 times or more. The composition of the air electrode conductive layer in the obtained solid oxide fuel cell and the results of the power generation test are described in Table 1 below.

Comparative Example 3

A solid oxide fuel cell was produced and a power generation test was carried out in the same manner as in Example 1 except for the fact that $(La_{0.5}Sr_{0.25}Ca_{0.25})_{1.01}MnO_3$ was used for the formation of the air electrode conductive layer, the average particle size of the coarse particles was set to 28.8 μm, and the average particle size of the fine particles was set to 2.7 μm. The power generation performance was 450 mA/cm²-0.73 V and the thermal cycle resistance was 10 times. The composition of the air electrode conductive layer in the obtained solid oxide fuel cell and the results of the power generation test are described in Table 1 below.

Comparative Example 4

A solid oxide fuel cell was produced and a power generation test was carried out in the same manner as in Example 1 except for the fact that $(La_{0.4}Sr_{0.3}Ca_{0.3})_{0.97}MnO_3$ was used for the formation of the air electrode conductive layer, the average particle size of the coarse particles was set to 27.8 μm, and the average particle size of the fine particles was set to 2.8 μm. The power generation performance was 450 mA/cm²-0.76 V and the thermal cycle resistance was 12 times. The composition of the air electrode conductive layer in the obtained solid oxide fuel cell and the results of the power generation test are described in Table 1 below.

Comparative Example 5

A solid oxide fuel cell was produced and a power generation test was carried out in the same manner as in Example 1 except for the fact that $(La)_{0.97}MnO_3$ was used for the formation of the air electrode conductive layer, the average particle size of the coarse particles was set to 28.2 μm, and the average particle size of the fine particles was set to 2.7 μm. The power generation performance was 450 mA/cm²-0.55 V and the thermal cycle resistance was 8 times. The composition of the air electrode conductive layer in the obtained solid oxide fuel cell and the results of the power generation test are described in Table 1 below.

Comparative Example 6

A solid oxide fuel cell was produced and a power generation test was carried out in the same manner as in Example 1 except for the fact that $(La_{0.4}Sr_{0.4}Ca_{0.2})_{0.97}MnO_3$ was used for the formation of the air electrode conductive layer, the average particle size of the coarse particles was set to 27.7 μm, and the average particle size of the fine particles was set to 2.7 μm. The power generation performance was 450 mA/cm²-0.77 V and the thermal cycle resistance was 10 times. The composition of the air electrode conductive layer in the obtained solid oxide fuel cell and the results of the power generation test are described in Table 1 below.

Comparative Example 7

A solid oxide fuel cell was produced and a power generation test was carried out in the same manner as in Example 1 except for the fact that $(La_{0.95}Sr_{0.02}Ca_{0.03})_{0.97}MnO_3$ was used for the formation of the air electrode conductive layer, the average particle size of the coarse particles was set to 28.9 μm, and the average particle size of the fine particles was set to 2.6 μm. The power generation performance was 450 mA/cm²-0.73 V and the thermal cycle resistance was 20 times or more. The composition of the air electrode conductive layer in the obtained solid oxide fuel cell and the results of the power generation test are described in Table 1 below.

Comparative Example 8

A solid oxide fuel cell was produced and a power generation test was carried out in the same manner as in Example 1 except for the fact that $(La_{0.5}Sr_{0.5})_{0.97}MnO_3$ was used for the formation of the air electrode conductive layer, the average particle size of the coarse particles was set to 28.1 μm, and the average particle size of the fine particles was set to 2.7 μm. The power generation performance was 450 mA/cm²-0.72 V and the thermal cycle resistance was 12 times. The composition of the air electrode conductive layer in the obtained solid oxide fuel cell and the results of the power generation test are described in Table 1 below.

Comparative Example 9

A solid oxide fuel cell was produced and a power generation test was carried out in the same manner as in Example 1 except for the fact that $(La_{0.5}Ca_{0.5})_{0.97}MnO_3$ was used for the formation of the air electrode conductive layer, the average particle size of the coarse particles was set to 27.8 μm, and the average particle size of the fine particles was set to 2.7 μm. The power generation performance was 450 mA/cm$^2$-0.73 V and the thermal cycle resistance was 20 times or more. The composition of the air electrode conductive layer in the obtained solid oxide fuel cell and the results of the power generation test are described in Table 1 below.

2). This result is considered to have occurred because the proportion of Mn became too high and thus the conductivity of the air electrode conductive layer decreased. In addition, in a case in which the proportion of Mn in the air electrode conductive layer became too low, the power generation performance and the thermal cycle resistance was degraded (Comparative Example 3). This result is considered to have occurred because the conductivity was decreased due to the degradation of the sinterability of the air electrode conductive layer and the adhesiveness between the air electrode conductive layer and the air electrode intermediate layer was insufficient. In addition, in a case in which the contents of Sr and Ca in the air electrode conductive layer were too high, the thermal cycle resistance was degraded (Comparative

TABLE 1

|  | Compositions of air electrode conductive layers (molar number) | | | | | Composition formulae of materials of air electrode conductive layer | Average particle size | | Power generation performance | Heat-resistant cycle |
|---|---|---|---|---|---|---|---|---|---|---|
|  | La | Sr | Ca | Mn | A/B ratio |  | Coarse particles (μm) | Fine particles (μm) | operation potential (V) | performance (times) |
| Example 1 | 0.475 | 0.2375 | 0.2375 | 1.00 | 0.92 | $(La_{0.5}Sr_{0.25}Ca_{0.25})_{0.92}MnO_3$ | 30.5 | 2.8 | 0.76 | >20 |
| Example 2 | 0.495 | 0.2475 | 0.2475 | 1.00 | 0.99 | $(La_{0.5}Sr_{0.25}Ca_{0.25})_{0.99}MnO_3$ | 30.1 | 2.9 | 0.77 | >20 |
| Example 3 | 0.485 | 0.2425 | 0.2425 | 1.00 | 0.97 | $(La_{0.5}Sr_{0.25}Ca_{0.25})_{0.97}MnO_3$ | 28.5 | 2.7 | 0.78 | >20 |
| Example 4 | 0.679 | 0.1455 | 0.1455 | 1.00 | 0.97 | $(La_{0.7}Sr_{0.15}Ca_{0.15})_{0.97}MnO_3$ | 29.4 | 2.9 | 0.77 | >20 |
| Example 5 | 0.873 | 0.0485 | 0.0485 | 1.00 | 0.97 | $(La_{0.9}Sr_{0.05}Ca_{0.05})_{0.97}MnO_3$ | 29.6 | 2.8 | 0.78 | >20 |
| Example 6 | 0.679 | 0.194 | 0.097 | 1.00 | 0.97 | $(La_{0.7}Sr_{0.2}Ca_{0.1})_{0.97}MnO_3$ | 29.9 | 2.8 | 0.76 | >20 |
| Example 7 | 0.582 | 0.097 | 0.291 | 1.00 | 0.97 | $(La_{0.6}Sr_{0.1}Ca_{0.3})_{0.97}MnO_3$ | 30.1 | 2.6 | 0.78 | >20 |
| Example 8 | 0.485 | 0.388 | 0.097 | 1.00 | 0.97 | $(La_{0.5}Sr_{0.4}Ca_{0.1})_{0.97}MnO_3$ | 27.9 | 2.8 | 0.78 | >20 |
| Example 9 | 0.485 | 0.097 | 0.388 | 1.00 | 0.97 | $(La_{0.5}Sr_{0.1}Ca_{0.4})_{0.97}MnO_3$ | 29.2 | 2.9 | 0.75 | >20 |
| Comparative Example 1 | 0.475 | 0.2375 | 0.2375 | 1.00 | 0.95 | $(La_{0.5}Sr_{0.25}Ca_{0.25})_{0.95}MnO_3$ | 17 | 2.7 | 0.74 | 15 |
| Comparative Example 2 | 0.465 | 0.2325 | 0.2325 | 1.00 | 0.91 | $(La_{0.5}Sr_{0.25}Ca_{0.25})_{0.91}MnO_3$ | 26.4 | 2.6 | 0.71 | >20 |
| Comparative Example 3 | 0.505 | 0.2525 | 0.2525 | 1.00 | 1.01 | $(La_{0.5}Sr_{0.25}Ca_{0.25})_{1.01}MnO_3$ | 28.8 | 2.7 | 0.73 | 10 |
| Comparative Example 4 | 0.388 | 0.291 | 0.291 | 1.00 | 0.97 | $(La_{0.4}Sr_{0.3}Ca_{0.3})_{0.97}MnO_3$ | 27.8 | 2.8 | 0.76 | 12 |
| Comparative Example 5 | 0.97 | 0 | 0 | 1.00 | 0.97 | $(La)_{0.97}MnO_3$ | 28.2 | 2.7 | 0.55 | 8 |
| Comparative Example 6 | 0.388 | 0.388 | 0.194 | 1.00 | 0.97 | $(La_{0.4}Sr_{0.4}Ca_{0.2})_{0.97}MnO_3$ | 27.7 | 2.7 | 0.77 | 10 |
| Comparative Example 7 | 0.9215 | 0.0194 | 0.0291 | 1.00 | 0.97 | $(La_{0.95}Sr_{0.02}Ca_{0.03})_{0.97}MnO_3$ | 28.9 | 2.6 | 0.73 | >20 |
| Comparative Example 8 | 0.485 | 0.485 | 0 | 1.00 | 0.97 | $(La_{0.5}Sr_{0.5})_{0.97}MnO_3$ | 28.1 | 2.7 | 0.72 | 12 |
| Comparative Example 9 | 0.485 | 0 | 0.485 | 1.00 | 0.97 | $(La_{0.5}Ca_{0.5})_{0.97}MnO_3$ | 27.8 | 2.7 | 0.73 | >20 |

As is clear from Table 1, in a case in which the coarse particles in the air electrode conductive layer were in the first average particle size range and the composition of the air electrode conductive layer satisfied General Formula (I), the solid oxide fuel cells having excellent power generation performance and thermal cycle resistance in which the power generation performance satisfied 0.75 V or more and the thermal cycle resistance was 20 times or more could be obtained (Examples 1 to 9).

On the contrary, in a case in which the coarse particles in the air electrode conductive layer were outside the first average particle size range, the power generation performance and the thermal cycle resistance degraded (Comparative Example 1). This result is considered to have occurred because the filling fractions of the coarse particles and the fine particles in the air electrode conductive layer decreased. In addition, in a case in which the proportion of Mn in the air electrode conductive layer became too high, the power generation performance degraded (Comparative Example 2). This result is considered to have occurred because the proportion of Mn became too high and thus the conductivity of the air electrode conductive layer decreased. In addition, in a case in which the proportion of Mn in the air electrode conductive layer became too low, the power generation performance and the thermal cycle resistance was degraded (Comparative Example 3). This result is considered to have occurred because the conductivity was decreased due to the degradation of the sinterability of the air electrode conductive layer and the adhesiveness between the air electrode conductive layer and the air electrode intermediate layer was insufficient. In addition, in a case in which the contents of Sr and Ca in the air electrode conductive layer were too high, the thermal cycle resistance was degraded (Comparative Examples 4 and 6). This result is considered to have occurred because the thermal expansion coefficient of the air electrode conductive layer became high and the air electrode conductive layer could not withstand the stress during the thermal cycle. In addition, in a case in which the air electrode conductive layer did not include Sr and Ca and a case in which the contents of Sr and Ca were small, the power generation performance significantly degraded (Comparative Examples 5 and 7) and the thermal cycle resistance was degraded (Comparative Example 5). This result is considered to have occurred because the conductive properties of the air electrode conductive layer were degraded and the sinterability deteriorated. In addition, in a case in which the content of Sr in the air electrode conductive layer was too high, the power generation performance and the thermal cycle resistance was degraded (Comparative Example 8). This result is considered to have occurred because a second phase was generated in the air electrode conductive layer. Furthermore, in addition, in a case in which the content of Ca in the air electrode conductive layer was too high, the power generation performance was degraded (Comparative Example 9). This result is considered to have occurred because the second phase was generated in the air electrode conductive layer.

DESCRIPTION OF REFERENCE NUMERALS AND SIGNS

10 SOLID OXIDE FUEL CELL
11 SUBSTRATE
12 SINGLE CELL
13 FUEL ELECTRODE
14 SOLID OXIDE ELECTROLYTE LAYER
151 AIR ELECTRODE INTERMEDIATE LAYER
152 AIR ELECTRODE CONDUCTIVE LAYER
152a COARSE PARTICLE
152b FINE PARTICLE
16 INTERCONNECTOR
17 FUEL
18 AIR

The invention claimed is:

1. A method for manufacturing a solid oxide fuel cell which includes an air electrode having an air electrode intermediate layer and an air electrode conductive layer, comprising: a first step of sequentially forming a fuel electrode and a solid oxide electrolyte layer on a substrate;
a second step of forming the air electrode intermediate layer on the solid oxide electrolyte layer; and
a third step of forming, on the air electrode intermediate layer, the air electrode conductive layer having a composition represented by General Formula (1) described below using a mixture obtained by mixing first particles in a first average particle size range in which the average particle size (d50) is in a range of 25.0 µm to 35.0 µm and second particles in a second average particle size range having an average particle size (d50) smaller than the first average particle size range,

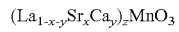 Formula (1)

(in Formula (1), x, y, and z satisfy $0<x<0.5$, $0<y<0.5$, $0.1 \leq x+y \leq 0.5$, and $0.92 \leq z \leq 0.99$).

2. The method for manufacturing a solid oxide fuel cell according to claim 1,
wherein the second average particle size range of the second particles is in a range of 2.5 µm to 3.0 µm.

3. The method for manufacturing a solid oxide fuel cell according to claim 1,
wherein the first particles are obtained using a spray dry method.

4. The method for manufacturing a solid oxide fuel cell according to claim 1,
wherein the mixing ratio between the first particles and the second particles is in a range of 40:60 to 60:40.

5. A solid oxide fuel cell manufactured using the method for manufacturing a solid oxide fuel cell according to claim 1.

6. The method for manufacturing a solid oxide fuel cell according to claim 2,
wherein the first particles are obtained using a spray dry method.

7. The method for manufacturing a solid oxide fuel cell according to claim 2,
wherein the mixing ratio between the first particles and the second particles is in a range of 40:60 to 60:40.

8. The method for manufacturing a solid oxide fuel cell according to claim 3,
wherein the mixing ratio between the first particles and the second particles is in a range of 40:60 to 60:40.

9. A solid oxide fuel cell manufactured using the method for manufacturing a solid oxide fuel cell according to claim 2.

10. A solid oxide fuel cell manufactured using the method for manufacturing a solid oxide fuel cell according to claim 3.

11. A solid oxide fuel cell manufactured using the method for manufacturing a solid oxide fuel cell according to claim 4.

12. The method for manufacturing a solid oxide fuel cell according to claim 1, wherein
the air electrode intermediate layer includes a ceria compound represented by $Sm_{1-x}Ce_xO_2$ ($0.8 \leq x \leq 0.9$).

* * * * *